(12) United States Patent
Yamane

(10) Patent No.: US 10,185,294 B2
(45) Date of Patent: Jan. 22, 2019

(54) VOLTAGE CONTROL DEVICE AND METHOD FOR CONTROLLING THE SAME

(71) Applicant: NEC Corporation, Tokyo (JP)

(72) Inventor: Takashi Yamane, Tokyo (JP)

(73) Assignee: NEC Corporation, Tokyo (JP)

( * ) Notice: Subject to any disclaimer, the term of this patent is extended or adjusted under 35 U.S.C. 154(b) by 453 days.

(21) Appl. No.: 14/430,734

(22) PCT Filed: Sep. 24, 2013

(86) PCT No.: PCT/JP2013/005607
§ 371 (c)(1),
(2) Date: Mar. 24, 2015

(87) PCT Pub. No.: WO2014/050063
PCT Pub. Date: Apr. 3, 2014

(65) Prior Publication Data
US 2015/0277403 A1    Oct. 1, 2015

(30) Foreign Application Priority Data
Sep. 25, 2012 (JP) ................................. 2012-211107

(51) Int. Cl.
*G05B 15/02* (2006.01)
*H02M 3/156* (2006.01)
*G06F 1/26* (2006.01)

(52) U.S. Cl.
CPC .............. *G05B 15/02* (2013.01); *G06F 1/26* (2013.01); *H02M 3/156* (2013.01); *H02M 2003/1566* (2013.01)

(58) Field of Classification Search
CPC ...................................................... G06F 1/26
USPC .......................................................... 713/300
See application file for complete search history.

(56) References Cited

U.S. PATENT DOCUMENTS

2014/0280066 A1* 9/2014 Petschulat ......... G06F 17/30539
707/722

FOREIGN PATENT DOCUMENTS

| JP | 4-196825 | 7/1992 |
|---|---|---|
| JP | 7-66722 | 3/1995 |
| JP | 2005-130616 | 5/2005 |
| JP | 2007-142617 | 6/2007 |
| WO | WO 2010/143605 A1 | 12/2010 |

OTHER PUBLICATIONS

Japanese Office Action dated Jul. 5, 2016, by the Japanese Patent Office in counterpart Japanese Patent Application No. 2014-538165.
International Search Report and Written Opinion dated Jan. 14, 2014 in corresponding PCT International Application.

* cited by examiner

*Primary Examiner* — Joseph Chang
(74) *Attorney, Agent, or Firm* — Finnegan, Henderson, Farabow, Garrett & Dunner, L.L.P.

(57) ABSTRACT

A voltage control device is disclosed. The voltage control device may have a voltage converting unit. The voltage converting unit may convert a voltage of a power supply on the basis of a target voltage. The voltage converting unit may also supply a converted voltage to a device to be supplied with voltage. The voltage control device may also have a control unit. The control unit may control the target voltage depending on an operation state of the device to be supplied with voltage.

17 Claims, 10 Drawing Sheets

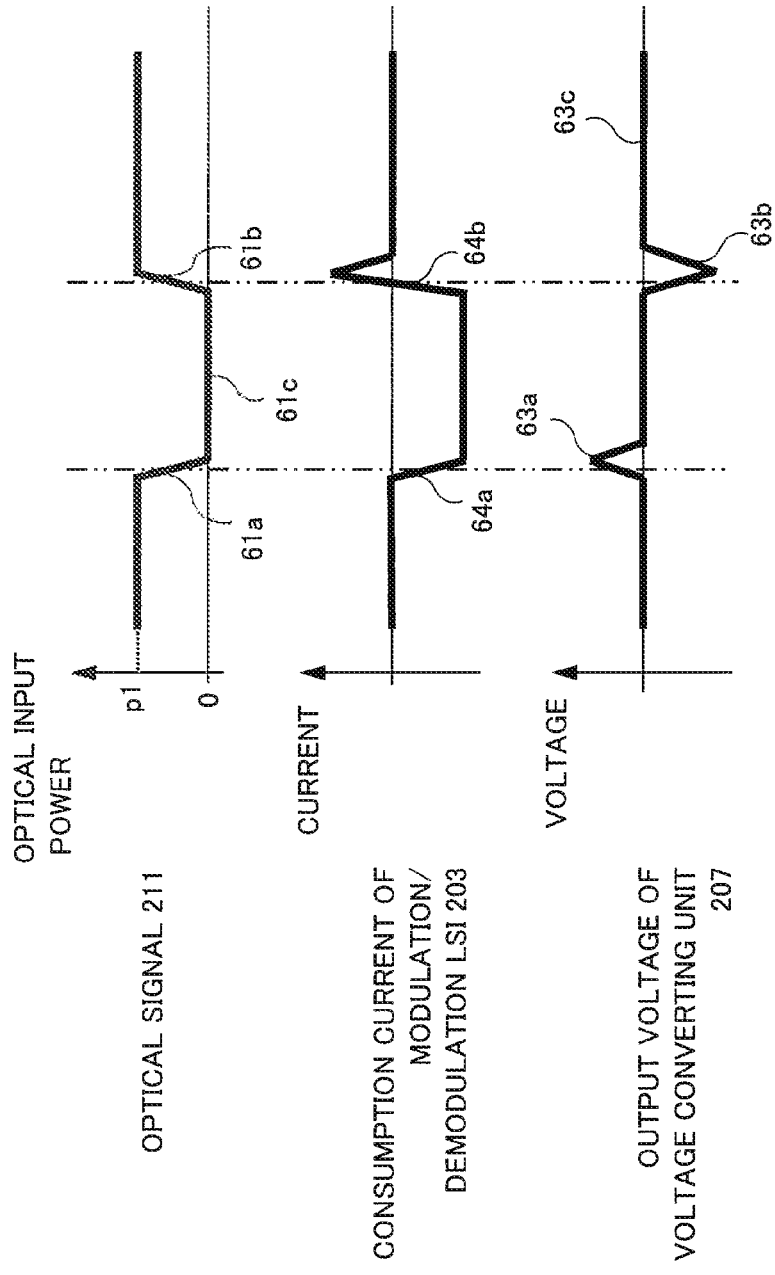

VOLTAGE CONTROL DEVICE AND METHOD FOR CONTROLLING THE SAME

CROSS-REFERENCE TO RELATED PATENT APPLICATIONS

This application is a National Stage Entry of International Application No. PCT/JP2013/005607, filed Sep. 24, 2013, which claims priority from Japanese Patent Application No. 2012-211107, filed Sep. 25, 2012. The entire contents of the above-referenced applications are expressly incorporated herein by reference.

TECHNICAL FIELD

The present invention relates to voltage control devices and methods for controlling the same and, in particular, to a voltage control device and a method for controlling the same which can suppress variation of a voltage due to an operation state of a device to be supplied with voltage.

BACKGROUND ART

Power consumption of a circuit necessary for modulation and demodulation applied to a recent modulation method becomes increasing steadily. Therefore, technologies for controlling power supply have been developed. Patent literature 1 describes an example of a control circuit which supplies electric power to a circuit receiving a wireless transmission signal through infrared ray. A power supply control circuit described in patent literature 1 includes a light receiving element, an amplification circuit, a signal processing circuit, D/A (digital/analog) converter, an audio amplifying circuit, a speaker, an auxiliary light receiving element, an auxiliary amplification circuit, a microcomputer, a switch, and a power supply, and it operates as follows. An infrared ray signal is photoelectrically-converted by the light receiving element, and a converted electric signal is amplified by the amplification circuit and is inputted into the signal processing circuit. A signal demodulated by the signal processing circuit is turned into an analog audio signal by the D/A converter and is amplified by the audio amplifying circuit to vibrate the speaker. Electric power is supplied by the power supply through the switch to the amplification circuit, the signal processing circuit, the D/A converter, and the audio amplifying circuit. The above-mentioned infrared ray signal is also light-received and photoelectrically-converted by the auxiliary light receiving circuit which is arranged near the light receiving element. The converted electric signal is amplified by the auxiliary amplification circuit and is inputted into the microcomputer. Here, an ON/OFF operation of the switch is carried out depending on the presence or absence of an input signal into the microcomputer. According to this, it is controlled to supply power for the light receiving element, the amplification circuit, the signal processing circuit, and the D/A converter which are used for demodulation from the infrared ray transmission signal to the audio signal.

CITATION LIST

Patent Literature

[PTL 1]
Japanese Patent Application Laid-Open Publication No. 04-196825

SUMMARY OF INVENTION

Technical Problem

In the case of patent literature 1, however, there is a case in which the presence or absence of the optical transmission signal based on the infrared ray, that is to say, a transient change of a pulsed optical signal causes a sudden change of a consumption current of the auxiliary light receiving element, the auxiliary amplification circuit, and the computer. As a result, there has been a problem that each element or each circuit used for modulation and demodulation of the audio signal causes an operation failure and the power supply itself generates noise.

Transmission using the optical signal is utilized not only for the wireless transmission but also for another transmission means. As an example, there is a communication method as typified by a digital coherent method. In the optical transmission system using the digital coherent method, advanced and complicated methods for modulation and demodulation are used and its consumption electric power becomes increasing drastically. FIG. 9 is a configuration diagram of a voltage control device in a related digital coherent optical transmission system. As shown in FIG. 9, a voltage control device 200 includes a photoelectric converter 202, a modulation/demodulation LSI 203, a voltage converting unit 207, and a power supply 201. The voltage control device 200 operates as follows. The photoelectric converter 202 converts an optical signal (optical waveform) 211 transmitted through an optical fiber into an electric signal (electric waveform), and then the electric signal is inputted into the modulation/demodulation LSI 203 and is decoded into a predetermined electric signal by the modulation/demodulation LSI 203. Because the modulation/demodulation LSI 203 is required to operate under a low-voltage condition, the supply voltage of the power supply 201 to the modulation/demodulation LSI 203 becomes lower. As a result, the consumption current of the modulation/demodulation LSI tends to increase remarkably. For this reason, it sometimes happens that the variation of the consumption current, which arises in switching the electric signal inputted into the modulation/demodulation LSI 203 between a conduction state and a non-conduction state (disconnection state), becomes several tens of ampere level.

Specific explanation will be provided below. FIG. 10 is a diagram to explain an operation of the voltage control device 200. FIG. 10 shows time changes of the optical signal 211 inputted into the photoelectric converter 202, the consumption current of the modulation/demodulation LSI 203, and the output voltage of the voltage converting unit 207, and a two-dot chain line in a longitudinal direction on paper represents the same time on three graphs. Switching the power of the optical signal 211 inputted into the photoelectric converter 202 between an input state (optical input power p1) and a cut-off state (optical input power 0) corresponds to switching the electric signal inputted into the modulation/demodulation LSI 203 between the conduction state and the non-conduction state. Referring to FIG. 10, when the optical input power changes (61a) from the input state to the cut-off state (61c), the electric signal inputted into the modulation/demodulation LSI 203 switches to the non-conduction state, and consequently the modulation/demodulation LSI 203 becomes unable to carry out a demodulation process normally and stops the demodulation operation. Simultaneously with this, the consumption current of the modulation/demodulation LSI 203 decreases rapidly (64a). At this time, a load viewed from the voltage converting unit 207, that is to say, the output current decreases rapidly. As a result, the voltage converting unit 207 supplies excessive electric power temporarily, and then the output voltage abruptly increases (63a). This sometimes exceeds a recommended range of the operation voltage of the modulation/demodulation LSI 203.

When the optical signal 211 changes from the cut-off state (61c) to the input state (61b), the modulation/demodulation LSI 203 resumes the demodulation operation because the electric signal inputted into the modulation/demodulation LSI 203 changes to the conduction state. Simultaneously with this, the consumption current of the modulation/demodulation LSI 203 increases rapidly (64b). At this time, the load viewed from the voltage converting unit 207, that is to say, the output current of the voltage converting unit 207 increases rapidly. As a result, the voltage converting unit 207 becomes in short supply of the electric power, and the output voltage abruptly decreases temporarily (63b) because the output voltage cannot follow the increase of the consumption current of the modulation/demodulation LSI 203 (64b). This sometimes decreases to the outside of the range of the recommended operation voltage of the modulation/demodulation LSI 203.

The rapid increase in the consumption current of the modulation/demodulation LSI 203 (64b) becomes diminished after having reached a peak value. The increase (63a) or the decrease (64b) in the output voltage 207 cannot be kept that way, and gradually returns to the original voltage level (63c) by means of a feedback control for a circuit integrated in the modulation/demodulation LSI 203.

There has been a problem that the above-mentioned change of the consumption current of the modulation/demodulation LSI causes the output voltage of the voltage converting unit to increase or decrease abruptly, and consequently an operation failure of the modulation/demodulation itself arises.

The object of the present invention is to provide a voltage control device and a method for controlling the same which solve the above-mentioned problem that the output voltage of a voltage supply source changes depending on according to the operation state of the device to be supplied with voltage.

Solution to Problem

A voltage control device according to an exemplary aspect of the present invention includes a voltage converting means for converting a voltage of a power supply on the basis of a target voltage and supplying a converted voltage to a device to be supplied with voltage; and a control means for controlling the target voltage depending on an operation state of the device to be supplied with voltage.

A method for controlling a voltage control device according to an exemplary aspect of the present invention includes converting a voltage of a power supply on the basis of a target voltage; supplying a converted voltage to a device to be supplied with voltage; and controlling the target voltage depending on an operation state of the device to be supplied with voltage.

Advantageous Effects of Invention

According to the present invention, it is possible to supply a stable power supply voltage even though the operation state of the device to be supplied with voltage varies.

BRIEF DESCRIPTION OF DRAWINGS

FIG. 10 is a diagram to describe an operation of the related voltage control device.

DESCRIPTION OF EMBODIMENTS

[The First Exemplary Embodiment]

Figure 1:
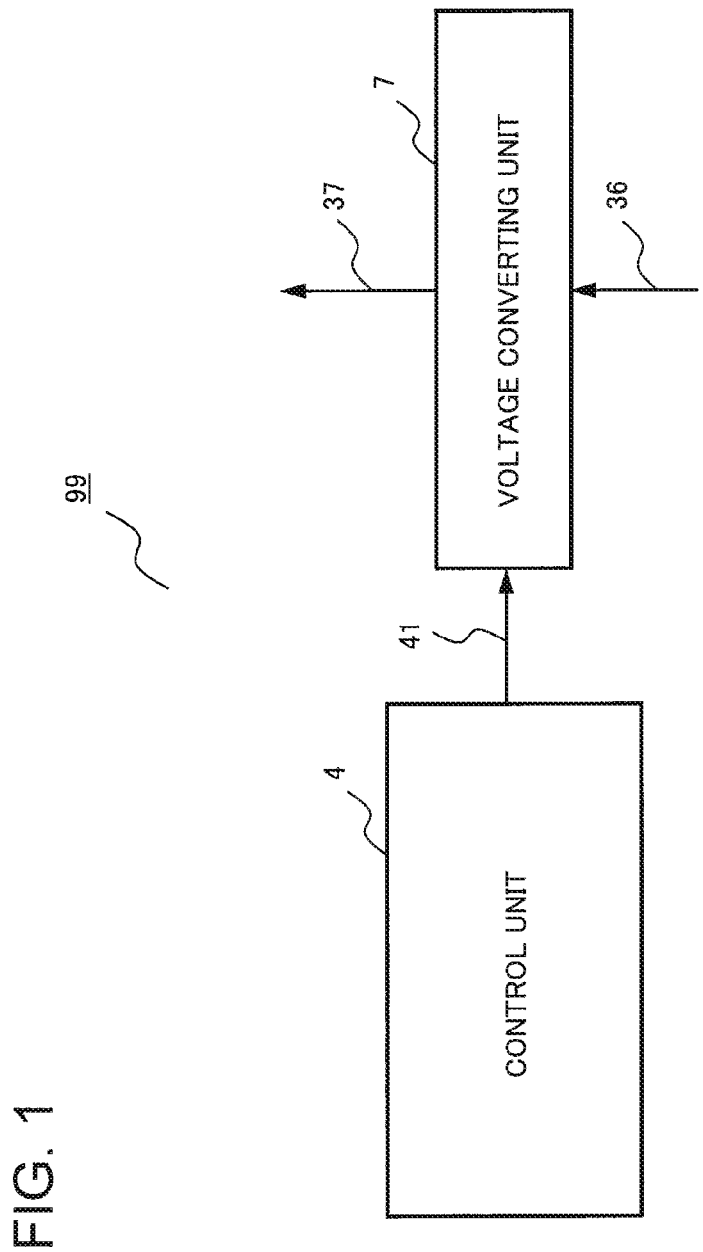
FIG. 1 is a block diagram illustrating a whole configuration of a voltage control device in accordance with the first exemplary embodiment of the present invention.

The first exemplary embodiment of the present invention will be described in detail with reference to drawings below. FIG. 1 is a block diagram illustrating a whole configuration of a voltage control device 99 in accordance with the first exemplary embodiment of the present invention.

Referring to FIG. 1, the voltage control device 99 in accordance with the first exemplary embodiment of the present invention includes a control unit 4 and a voltage converting unit 7. The control unit 4 controls a voltage which the voltage converting unit 7 supplies to a device to be supplied with voltage. In other words, the voltage variation of the voltage converting unit 7 depending on an operation state of the device to be supplied with voltage is controlled to be a predetermined voltage. In the following description, it is assumed that the predetermined voltage is a target voltage.

The control unit 4 outputs a signal 41, and controls the target voltage of the voltage converting unit 7 depending on the operation state of the device to be supplied with voltage on the basis of the signal.

The voltage converting unit 7 is a DC-DC converter, an AC-DC converter or the like, converts a voltage 36 supplied by a power supply (not shown in the drawing) into the target voltage necessary for an operation of the device to be supplied with voltage, and outputs a supply voltage 37 to the device to be supplied with voltage. In addition, it is possible to change the target voltage of the device to be supplied with voltage by the signal 41 from the control unit 4. Specifically, the target voltage of the voltage converting unit 7 is determined depending on a voltage value of the signal 41, and an output voltage converges on it.

Figure 9:
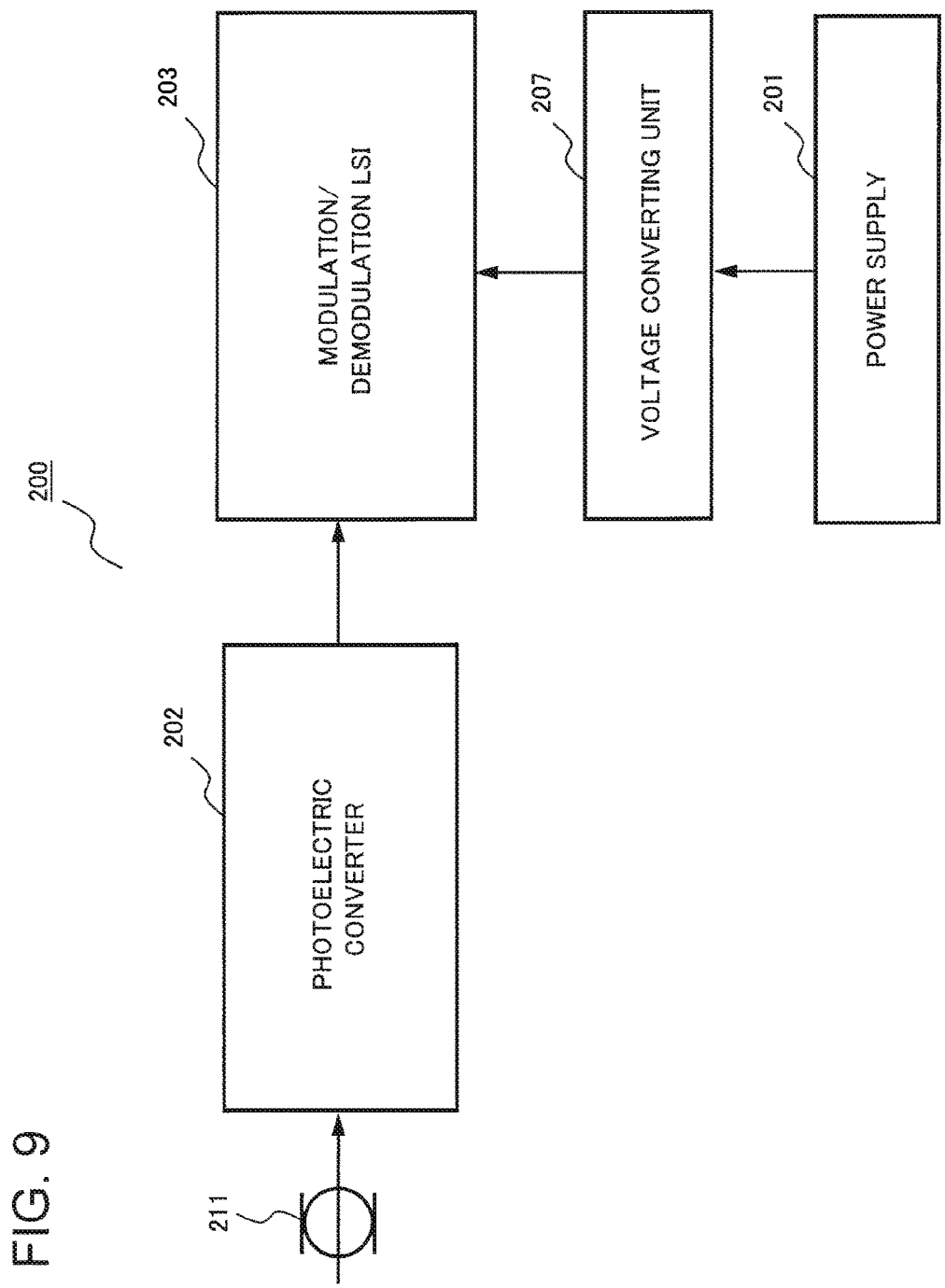
FIG. 9 is a block diagram illustrating a whole configuration of a related voltage control device.

An operation in accordance with the first exemplary embodiment of the present invention will be described. The device to be supplied with voltage of the first exemplary embodiment is the modulation/demodulation LSI 203 shown in FIG. 9, for example. In the following description of the exemplary embodiment, the device to be supplied with voltage will be described as the modulation/demodulation LSI. As shown in FIG. 10, the operation state of the device to be supplied with voltage varies according to an electric signal inputted into the device to be supplied with voltage. That is to say, when the electric signal is in a conduction state, the device to be supplied with voltage consumes a constant current. When the electric signal is in a cut-off state, the consumption current of the device to be supplied with voltage is reduced to a constant level. When the electric signal is switched from the conduction state to the non-conduction state, the consumption current of the device to be supplied with voltage rapidly decreases. When the electric signal is switched from the non-conduction state to the conduction state, the consumption current of the device to be supplied with voltage rapidly increases. The target voltage is changed by the signal 41 from the control unit 4 depending on respective operation states. For example, when the consumption current with two different levels of the conduction state and the non-conduction state is changed, a voltage level of the target voltage is changed. When the consumption current has reached a constant level, according to this, the target voltages are determined at two constant voltage levels different from each other, and then the output voltage of the voltage converting unit 7 converges. At a switching time or state between the conduction state and the non-conduction state, a rapid voltage change is added to the target voltage by the signal 41 so that a rapid change of the consumption current may be suppressed. According to this, a variation of the output voltage of the voltage converting unit 7 becomes smaller.

This enables to supply a stable power supply voltage even though the operation state of the device to be supplied with voltage is changed.

The control unit 4 of the first exemplary embodiment can obtain an information signal including the above-mentioned operation state from the device to be supplied with voltage in order to obtain the operation state of the device to be supplied with voltage. It is also acceptable to include a detection unit detecting the operation state and obtain the operation state of the device to be supplied with voltage on the basis of a signal from the detection unit. In any means, the operation state of the device to be supplied with voltage is determined by the obtained information, on the basis of which the target voltage of the voltage converting unit 7 is determined.

[The Second Exemplary Embodiment]

Figure 2:
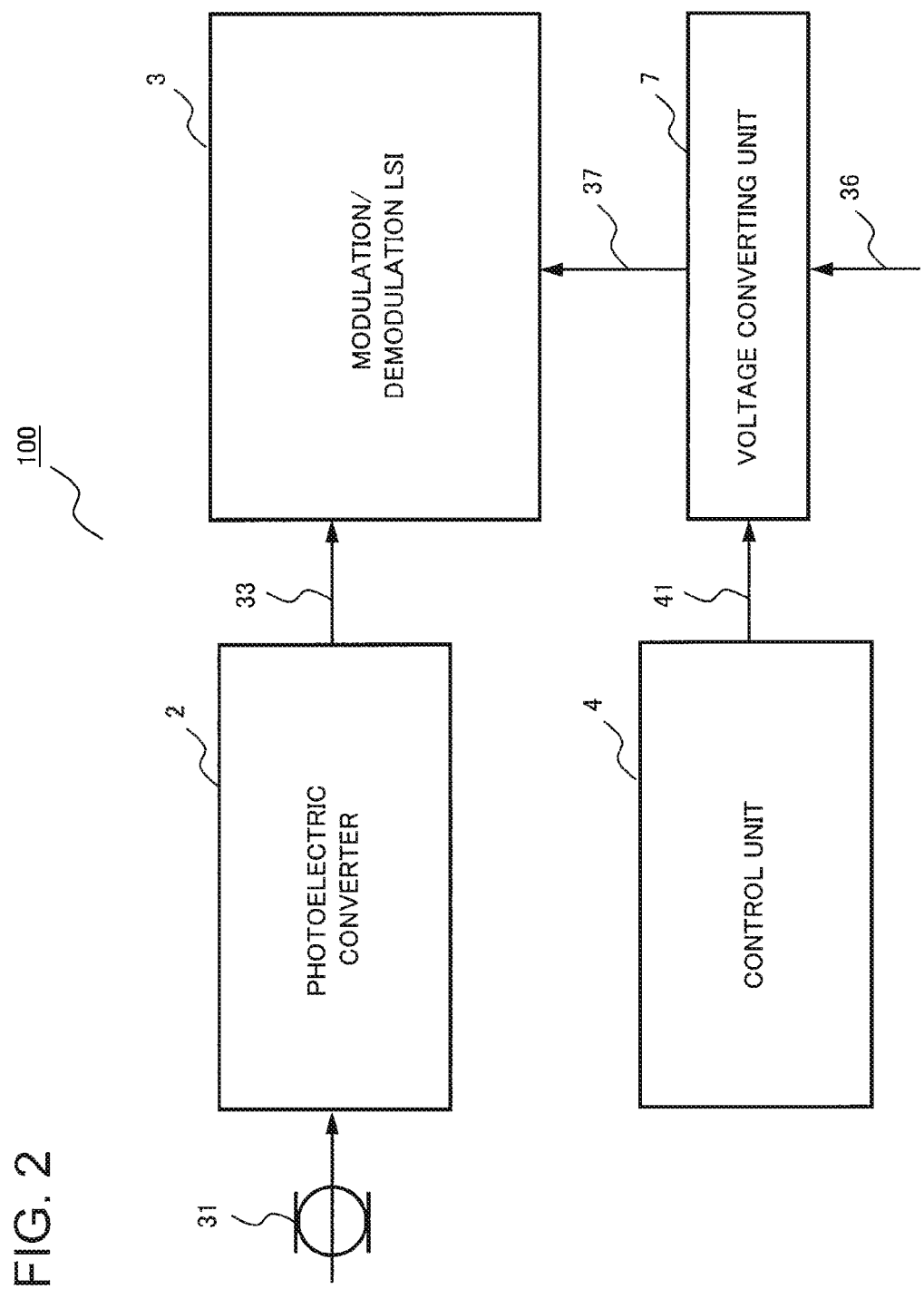
FIG. 2 is a block diagram illustrating a whole configuration of a voltage control device in accordance with the second exemplary embodiment of the present invention.

Next, the second exemplary embodiment will be described in detail with reference to drawings. FIG. 2 is a block diagram illustrating a whole configuration of a voltage control device 100 in accordance with the second exemplary embodiment of the present invention. With reference to FIG. 2, the voltage control device 100 is configured to add a photoelectric converter 2 and a modulation/demodulation LSI 3 to the configuration of the first exemplary embodiment. By the configuration mentioned above, an optical signal 31 transmitted through an optical fiber is inputted into the photoelectric converter 2, and the modulation/demodulation LSI 3 outputs an electric signal decoded by a digital signal processing. As is the case with the first exemplary embodiment, the device to be supplied with voltage corresponds to the modulation/demodulation LSI 3.

The photoelectric converter 2 receives the optical signal (optical waveform) 31 transmitted through the optical fiber, and converts it into an electric signal (electric waveform) 33. The photoelectric converter 2 uses a photodiode utilizing materials such as GaAs and Si.

The modulation/demodulation LSI 3 inputs the electric signal 33 from the photoelectric converter 2, detects an information signal which is superimposed on a frequency or a phase of the electric signal 33, and demodulates it into an intended electric signal by the digital signal processing and outputs it. The electric power is supplied by the supply voltage 37 from the voltage converting unit 7 to operate as mentioned above.

The control unit 4 inputs an electric signal corresponding to the electric signal 33 inputted into the modulation/demodulation LSI 3, and detects a state switching between an ON state and an OFF state of the electric signal. The control unit 4 outputs to the voltage converting unit 7 the signal 41 which changes in response to the detected switching timing. Here, the signal 41 is a signal to control the target voltage of the voltage converting unit 7, and keeps its voltage level constant before and after the switching timing as is the case with the detection signal. In the following description, the electric signal inputted into the control unit 4 will be represented as the detection signal.

Figure 3:
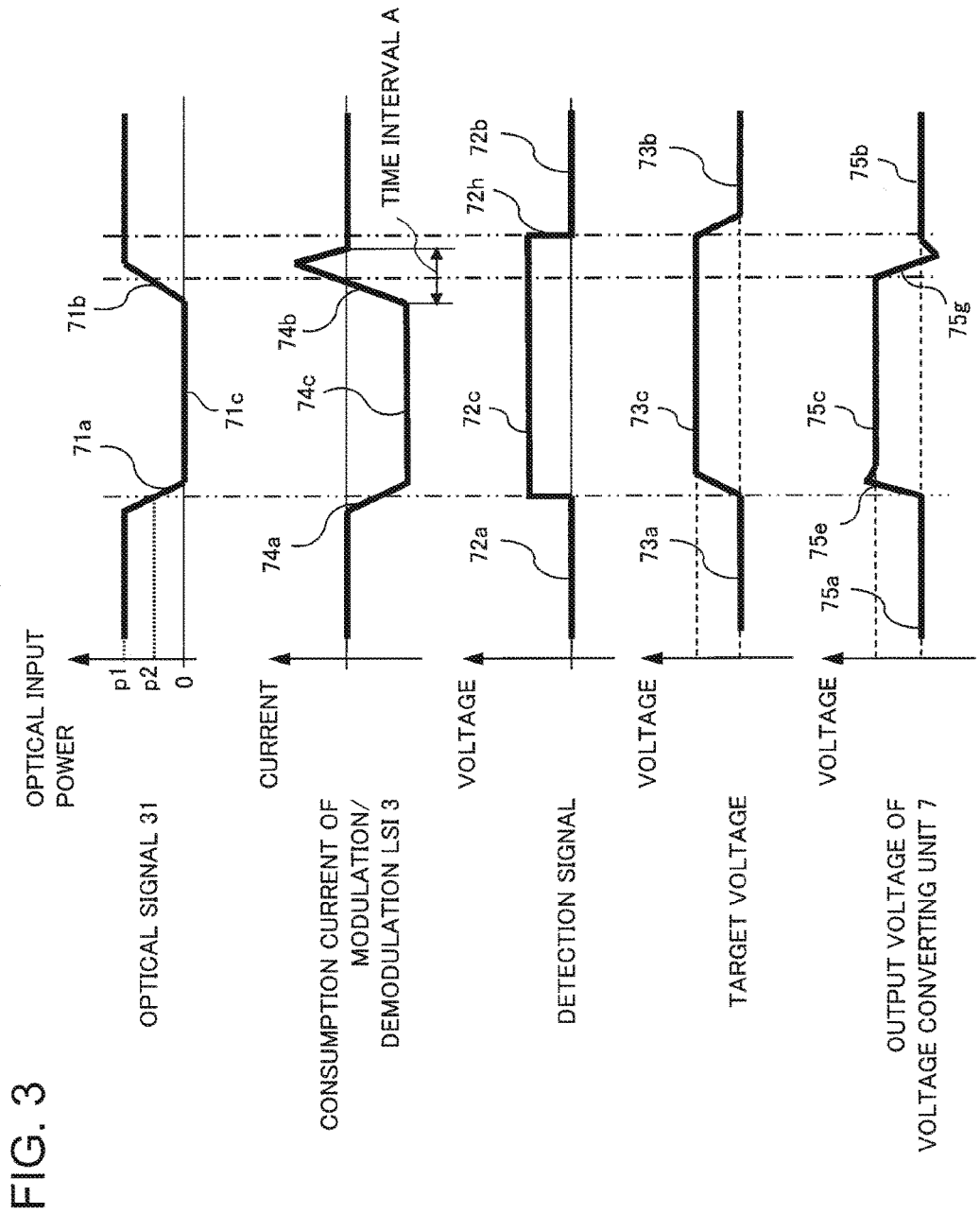
FIG. 3 is a diagram to describe an operation of the voltage control device in accordance with the second exemplary embodiment of the present invention.

Next, the operation of the second exemplary embodiment of the present invention will be described with reference to FIG. 3. FIG. 3 is a diagram to describe the operation of the voltage control device in accordance with the second exemplary embodiment of the present invention. FIG. 3 shows time changes of the optical signal 31 inputted into the photoelectric converter 2, the consumption current of the modulation/demodulation LSI 3, the detection signal inputted into the control unit 4, the target voltage determined by the signal 41 output from the control unit 4, and the output voltage of the voltage converting unit 7, and a two-dot chain line in a longitudinal direction on paper represents the same time on five graphs. Here, the graphs in FIG. 3 representing time changes of the optical signal 31 and the consumption current of the modulation/demodulation LSI 3 are the same as the graphs of the optical signal 211 and the consumption current of the modulation/demodulation LSI 203 in FIG. 10. Similarly to FIG. 10, switching between an input state (optical power p1.) and a cut-off state (optical power 0) of the optical signal 31 inputted into the photoelectric converter 2 corresponds to switching between a conduction state and a non-conduction state of the electric signal 33 inputted into the modulation/demodulation LSI 3. In a state that the photoelectric converter 2 is electrically connected to the modulation/demodulation LSI 3, the conduction state of the electric signal 33 means a case that there is an information signal, and the non-conduction state of the electric signal 33 means a case that there is not an information signal. The electric signal 33 corresponding to the input state of the optical signal 31 maintains a constant voltage level in the conduction state, and the electric signal 33 corresponding to the cut-off state of the optical signal 31 has, in the non-conduction state, a constant voltage level which is lower than that in the conduction state. That is to say, the electric signal 33 has a prescribed voltage difference, the upper level of the voltage difference corresponds to the conduction state, and the lower level corresponds to the non-conduction state. The detection signal is a signal which has two voltage levels corresponding to the input state (optical input power p1) and the cut-off state (71c, optical input power 0) of the optical signal 31. That is to say, it is a signal which becomes equal to the lower voltage level if the optical input power is higher than p2, and becomes equal to the upper voltage level if the optical input power is lower than p2, with reference to the optical input power p2 (a half of p1, for example).

With reference to FIG. 3, according to a change from the low level (72a) to the high level (72c) of the detection signal inputted into the control unit 4 (a change from the input state to the cut-off state of the optical signal 31 (71a)), the target voltage is changed from the constant low level (73a) to the constant high level (73c) by the signal 41 output from the control unit 4. According to a change from the high level (72c) to the low level (72b) of the detection signal (a change from the cut-off state to the input state of the optical signal 31 (71b)), the target voltage is changed from the constant high level (73c) to the constant low level (73b) by the signal 41 output from the control unit 4. Here, a time when the detection signal is changed from the low level (72a) to the high level (72c) is almost the same as an intermediate time between the rapid decrease in the consumption current of the modulation/demodulation LSI 3 (74a). A time (72h) when the detection signal is changed from the high level (72c) to the low level (72b) is delayed temporally in comparison with a time when the consumption current of the modulation/demodulation LSI 3 increases abruptly (74b). That is to say, the time interval A for the abrupt increase (74b) is estimated in advance, and the change time (72h) is set at a time delayed in comparison with a time which is shifted by the time interval A from the time when the consumption current of the modulation/demodulation LSI 3 is changed from the low level state (74c) to the rapid increase. It is taken as given that the target voltage keeps constant until variation of the output voltage of the voltage converting unit, corresponding to the abrupt increase in the consumption current of the modulation/demodulation LSI 3 (74b), converges. Here, the time interval A is defined as an time interval from a time when the consumption current of the modulation/demodulation LSI 3 increases from the low level (74c) to a time when the consumption current decreases to a constant level after reaching a peak value.

If the target voltage of the voltage converting unit 7 is lowered (73a and 73b), the supply voltage to the modulation/demodulation LSI 3 is shifted to a lower limit side of a recommended range of power supply voltage (75a and 75b). If the target voltage of the voltage converting unit 7 is raised (73c), the supply voltage to the modulation/demodulation LSI 3 is shifted to an upper limit side of the recommended range of power supply voltage (75c).

When the optical signal 31 is changed between the cut-off state and the input state (71a and 71b), the abrupt change occurs in the output voltage of the voltage converting unit 7 shown in FIG. 10. However, by setting the target voltage as mentioned above, a waveform of the output voltage of the voltage converting unit 7 is shown as a bottom graph in FIG. 3. That is to say, even if the abrupt change (increase (75e) or decrease (75g)) of the output voltage of the voltage converting unit 7 occurs, it is possible to suppress the abrupt variation of the operation voltage which is supplied to the modulation/demodulation LSI 3 because the target voltage is changed depending on the abrupt increase (or decrease) of the output voltage.

[The Third Exemplary Embodiment]

Figure 4:
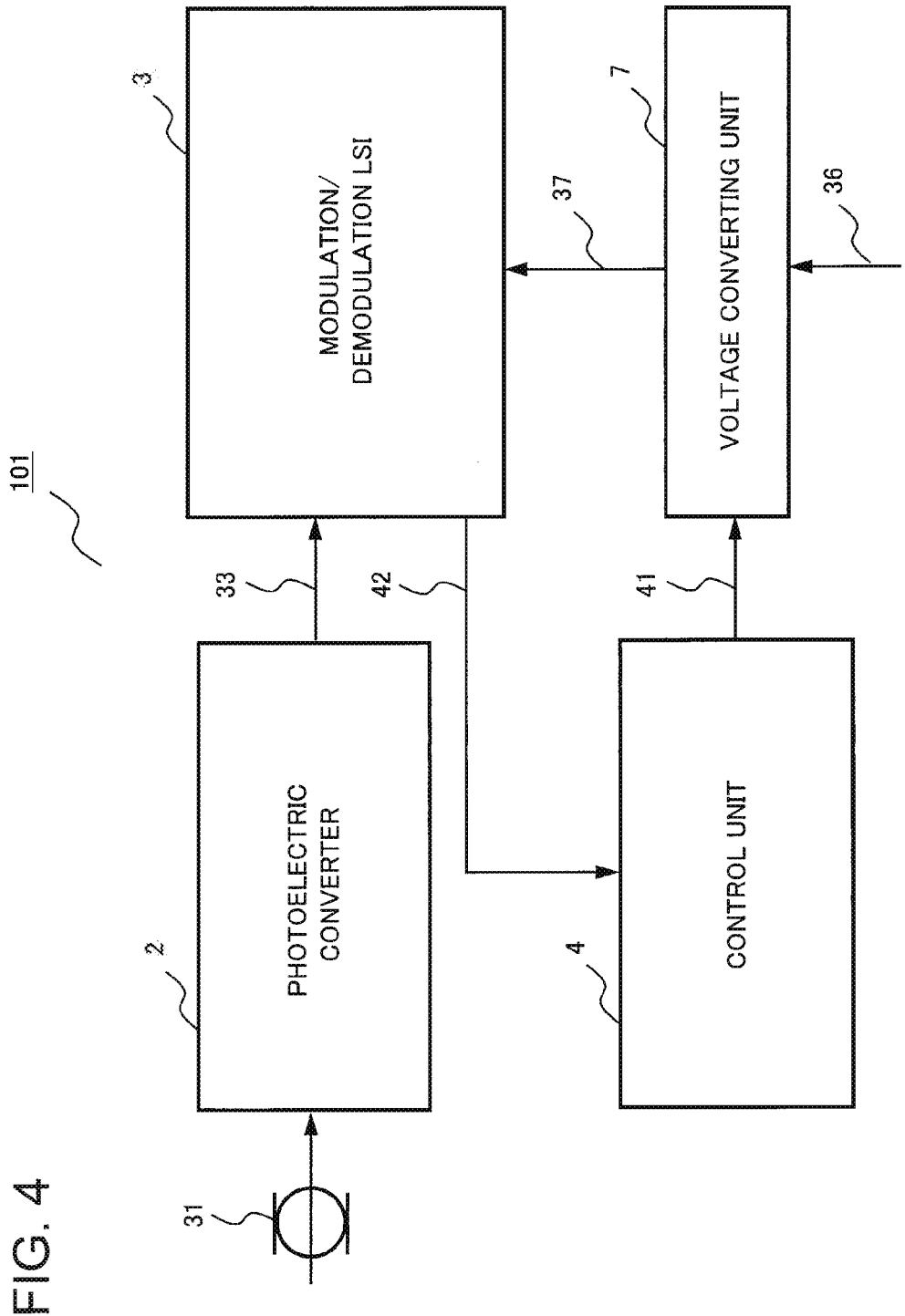
FIG. 4 is a block diagram illustrating a whole configuration of a voltage control device in accordance with the third exemplary embodiment of the present invention.

Next, the third exemplary embodiment will be described in detail with reference to drawings. FIG. 4 is a block diagram illustrating a whole configuration of a voltage control device 101 in accordance with the third exemplary embodiment of the present invention. In the voltage control device 101 of the third exemplary embodiment, a monitoring signal 42 output from the modulation/demodulation LSI 3 is inputted into the control unit 4. The configurations except the above are the same as those of the second exemplary embodiment.

The monitoring signal 42 has two voltage levels corresponding to the input state and the cut-off state of the optical signal 31. The optical signal 31 is converted into the electric signal 33 by the photoelectric converter 2 and inputted into the modulation/demodulation LSI 3. The conventional modulation/demodulation LSI 3 includes a signal monitoring the state of the inputted electric signal 33. As the monitoring signal 42, LOS (Loss-Of-Signal) is used, for example, by which the existence or non-existence of a signal loss is judged by an amplitude value of an electric signal. Alternatively, OOF (Out-Of-Frame), LOF (Loss-OF-Frame), LOL (Loss-Of-Lock), or the like can be used which is utilized for judging whether a frame structure of a signal successfully demodulated from the electric signal is normally detected according to prescribed standards. Here, by making the voltage level of the monitoring signal 42 high and constant if the optical signal 31 is in the cut-off state (the electric signal 33 is in the non-conduction state), and making the voltage level of the monitoring signal 42 low and constant if the optical signal 31 is in the input state (the electric signal 33 is in the conduction state), the same waveform as the detection signal of the second exemplary embodiment can be obtained. By inputting the monitoring signal 42 as the detection signal, it is possible to suppress the variation of the supply voltage to the modulation/demodulation LSI 3 as is the case with the second exemplary embodiment. By using the monitoring signal included in the existing modulation/demodulation LSI 3, it is unnecessary to prepare additionally a detection and judgment unit which detects the cut-off state and the input state of the optical signal 31. The modulation/demodulation LSI 3 can output various signals other than the monitoring signal 42. That is to say, the above-mentioned information signal includes the monitoring signal 42 of the modulation/demodulation LSI 3.

While it is assumed that the detection signal in the second exemplary embodiment and the third exemplary embodiment has the constant low voltage level with the optical signal 31 in the input state, and it has the constant high voltage level with the optical signal 31 in the cut-off state, it is not limited to this. It is also acceptable to be set at the constant high voltage level with the optical signal 31 in the input state, and at the constant low voltage level with the optical signal 31 in the cut-off state.

[The Fourth Exemplary Embodiment]

Figure 5:
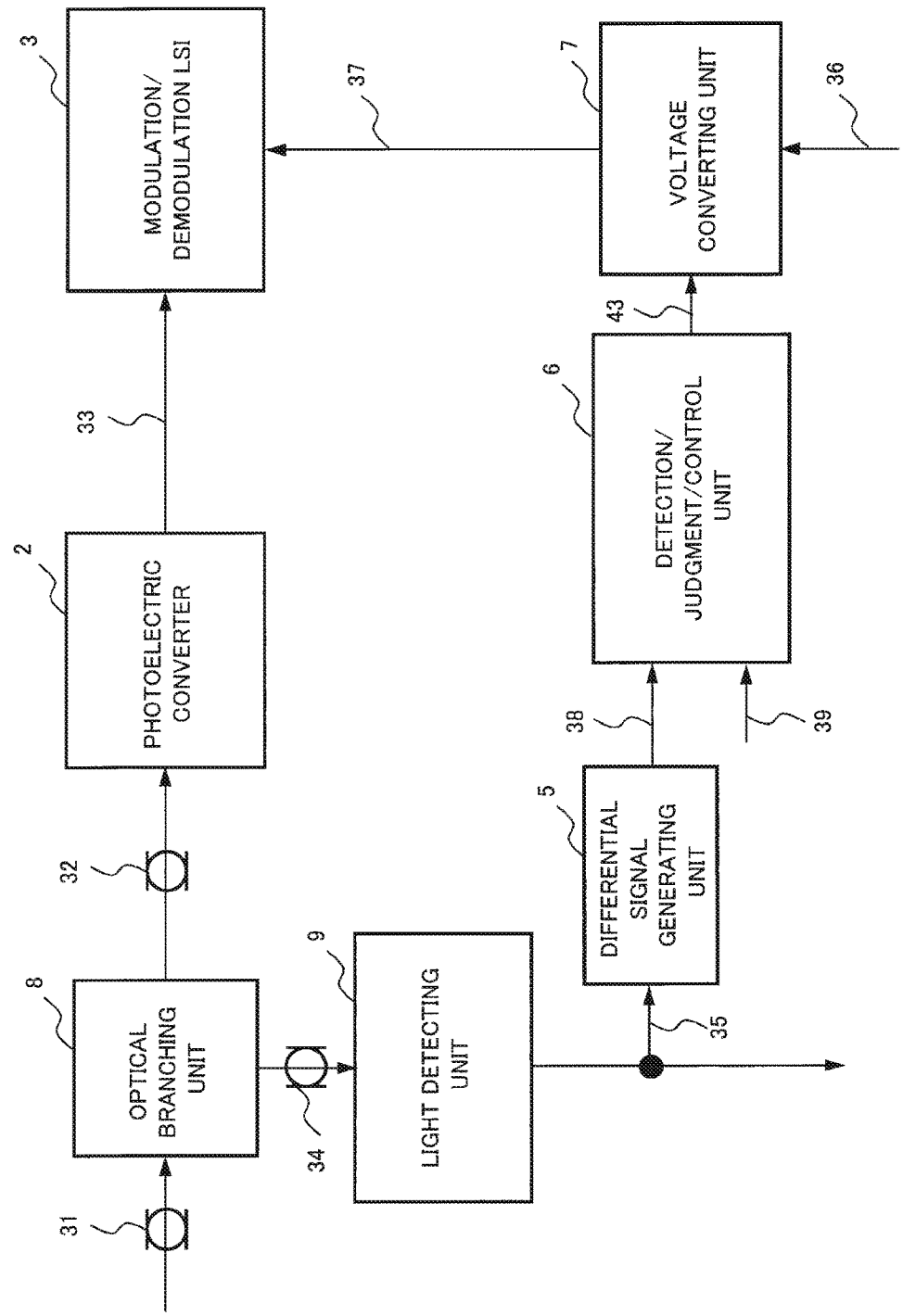
FIG. 5 is a block diagram illustrating a whole configuration of a voltage control device in accordance with the fourth exemplary embodiment of the present invention.

Next, the fourth exemplary embodiment will be described in detail with reference to a drawing. FIG. 5 is a block diagram illustrating a whole configuration of a voltage control device 102 in accordance with the fourth exemplary embodiment of the present invention. In the voltage control device 102 of the fourth exemplary embodiment, a part of the optical signal 31 is divided, and a signal, which detects an input state and a cut-off state by the divided optical signal 34. Components which are the same as those of the above-mentioned exemplary embodiments are represented by the same signs.

With reference to FIG. 5, the voltage control device 102 in accordance with the fourth exemplary embodiment of the present invention includes the photoelectric converter 2, the modulation/demodulation LSI 3, a differential signal generating unit 5, a detection/judgment/control unit 6, the voltage converting unit 7, an optical branching unit 8, and a light detecting unit 9.

The optical branching unit 8 is an element having a function of making the light branch and includes a half mirror, a beam splitter, a waveguide element or the like. By means of the optical branching unit 8, a part of the optical signals (optical waveform) 31 transmitted through an optical fiber is divided and the optical signal 34 is extracted. An optical wave passing through the optical branching 8 is represented by an optical signal 32.

The light detecting unit 9, which is a detection unit to detect an optical signal, receives the optical signal 34 and converts it into an electric signal. The electric signal changes between a conduction state and a non-conduction state according to the input state and the cut-off state of the optical signal 34.

The differential signal generating unit 5 includes a differential circuit, inputs a signal 35 which is at least part of the above-mentioned electric signals, and outputs a differential signal 38. The differential signal 38 corresponds to a waveform derived from differentiating the electric waveform of the signal 35 with respect to time, and its waveform has a steep rise and a steep fall at a transition time between the conduction state and the non-conduction state (81*a* and 81*b* in FIG. 6 mentioned below).

The detection/judgment/control unit 6 has a function of controlling the target voltage generated by the voltage converting unit 7, inputs the differential signal 38 and a reference signal 39, and outputs a signal 43. Comparing the differential signal 38 with the reference signal 39 of a constant voltage level (plus or minus REF), the detection/judgment/control unit 6 detects the differential signal 38 exceeding the reference signal 39, and outputs the signal 43 corresponding to the detected signal. Here, "exceeding" means that the absolute value of a signal level of the differential signal 38 is larger than the absolute value of REF. It is judged from exceeding REF of the reference signal 39 that the optical waveform 31, the optical waveform 32, or the optical waveform 34 changes between the input state and the cut-off state. The voltage level of +REF (or −REF) is set at a value from 10 to 20% on the basis of the maximum value (or the minimum value) of the differential signal 38. This enables to detect a transition of the optical signal between the input state and the cut-off state at early timing with preventing false detection due to electric noise included in the differential signal.

In order to ease the steep rise (or fall) of the differential signal 38 exceeding +REF (or −REF) by setting the reference signal 39 as mentioned above, the target voltage has a steep rise (or fall) similar to that. The fall from the maximum value (or the rise from the minimum value) of the target voltage is more gradual than the fall (or the rise) of the differential signal 38 exceeding +REF (or −REF). After the rapid decrease (74*a*) or the abrupt increase (74*a*) of the consumption electric power of the modulation/demodulation LSI 3, the output voltage of the voltage converting unit decreases from the peak. The fall of the target voltage is made gradual in order to ease the decrease after the peak.

The rise and the fall of the target voltage due to the signal 43 will be described specifically below. A time interval of the rise to the maximum value (or the fall to the minimum value) of the differential signal 38 is set to be almost equal to a time interval of the rise to the maximum value (or the fall to the minimum value) of the target voltage, and a time interval of the fall from the maximum value (or the rise from the minimum value) of the target voltage is set to be longer than a time interval of the fall from the maximum value (or the rise from the minimum value) of the differential signal 38. Here, the time interval of the fall from the maximum value (or the rise from the minimum value) of the target voltage is adjusted by tuning a time constant of the differential circuit. As a result, a waveform of the target voltage becomes a sawtooth wave during the region that the differential signal 38 is changed steeply (the region that the electric signal 33 changes between the conduction state and the non-conduction state).

Figure 6:
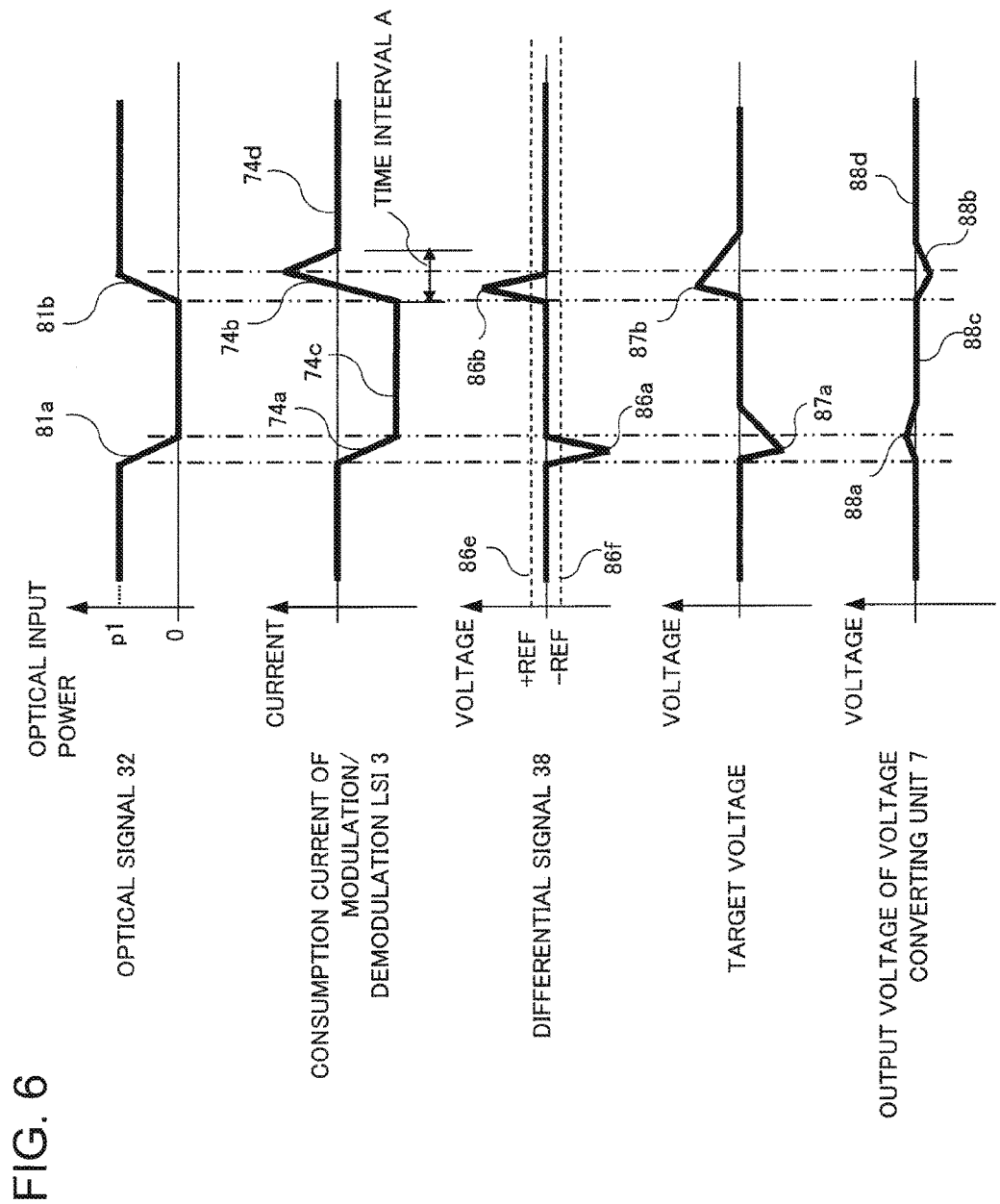
FIG. 6 is a diagram to describe an operation of the voltage control device in accordance with the fourth exemplary embodiment of the present invention.

Next, the operation in the fourth exemplary embodiment of the present invention will be described with reference to FIG. 6. FIG. 6 is a diagram illustrating the operation of the voltage control device in accordance with the fourth exemplary embodiment of the present invention. FIG. 6 shows time changes of the optical signal 32 inputted into the photoelectric converter 2, the consumption current of the modulation/demodulation LSI 3, the differential signal 38 output from the differential signal generating unit 5, the target voltage determined by the signal 43 output from the detection/judgment/control unit 6, and the output voltage of the voltage converting unit 7, and a two-dot chain line in a longitudinal direction on paper represents the same time on five graphs. Here, the graphs in FIG. 6 representing time changes of the optical signal 32 and the consumption current of the modulation/demodulation LSI 3 are the same as the graphs of the optical signal 211 and the consumption current of the modulation/demodulation LSI 203 in FIG. 10. Similarly to FIG. 10, switching between an input state (optical input power p1) and a cut-off state (optical input power 0) of the optical signal 32 inputted into the photoelectric converter 2 corresponds to switching between the conduction state and the non-conduction state of the electric signal 33 inputted into the modulation/demodulation LSI 3. The conduction state of the electric signal 33 corresponding to the input state of the optical signal 32 has a constant voltage level. The non-conduction state of the electric signal 33 corresponding to the cut-off state of the optical signal 32 has a constant voltage level which is lower than that of the conduction state. That is to say, the electric signal 33 has a prescribed voltage difference, the upper level of the voltage difference corresponds to the conduction state, and the lower level corresponds to the non-conduction state.

With reference to FIG. 6, the target voltage is controlled to be lowered at the time when the signal level of the differential signal 38 exceeds the constant voltage level −REF 86*f* of the reference signal 39. The minimum value 86*a* of the differential signal 38 corresponds to the minimum value 87*a* of the target voltage. The target voltage is controlled to be raised at the time when the signal level of the differential signal 38 exceeds the constant voltage level +REF 86*e* of the reference signal 39. The maximum value 86*b* of the differential signal 38 corresponds to the maximum value 87*b* of the target voltage. Here, the time when the target voltage has completely fallen from the maximum value 87*b* is set at the later time than a time when the consumption electric power of the modulation/demodulation LSI 3 increases abruptly (74*b*). That is to say, the time interval A for the abrupt increase (74*b*) is estimated in advance, and the time when the target voltage has completely fallen is set at a time delayed in comparison with a time which is shifted by the time interval A from the time when the consumption current of the modulation/demodulation LSI 3 is changed from the low level state (74*c*) to the rapid increase. The variation of the output voltage of the voltage converting unit decreases after reaching the peak. The above-mentioned setting time is delayed in order to ease the output variation during the decreasing process. The time when the consumption electric power of the modulation/demodulation LSI 3 changes from the lowered state (74*c*) to the rapid increase is not coincident with the time when the target voltage starts rising toward the maximum value 87*b*, but they are almost equal to each other. Therefore, there is no practical problem in setting the time when the target voltage has completely fallen from the maximum value 87b as mentioned above.

In other words, the target voltage is set as follows. Corresponding to the increase of the output voltage of the voltage converting unit 7 (63a) shown in FIG. 10, the target voltage of the voltage converting unit 7 is shifted as a waveform changing from a fall through the minimum value (87a) to a rise. Corresponding to the decrease (63b) of the output voltage of the voltage converting unit 7 shown in FIG. 10, the target voltage of the voltage converting unit 7 is shifted as a waveform changing from a rise through the maximum value (87b) to a fall. As a result, the waveform of the output voltage of the voltage converting unit 7 is shown as a bottom graph in FIG. 6. That is to say, even if the abrupt change of the output voltage of the voltage converting unit 7 occurs, it is possible to make the output voltage converge (88a, 88b, 88c and 88d) by shifting the target voltage according to the change. This enables to suppress the variation of the supply voltage to the modulation/demodulation LSI 3. It is possible to make the output voltage of the voltage converter unit 7 always converge on neighborhood of the optimum operation voltage of the modulation/demodulation LSI 3 because the target voltage is shifted only when the output voltage of the voltage converter unit 7 abruptly changes. While the differential signal 38 in the present exemplary embodiment is a first order differential signal of the signal 35, it is not limited to this. The differential signal 38 can be a second order differential signal or a high-order differential signal.

[The Fifth Exemplary Embodiment]

Figure 7:
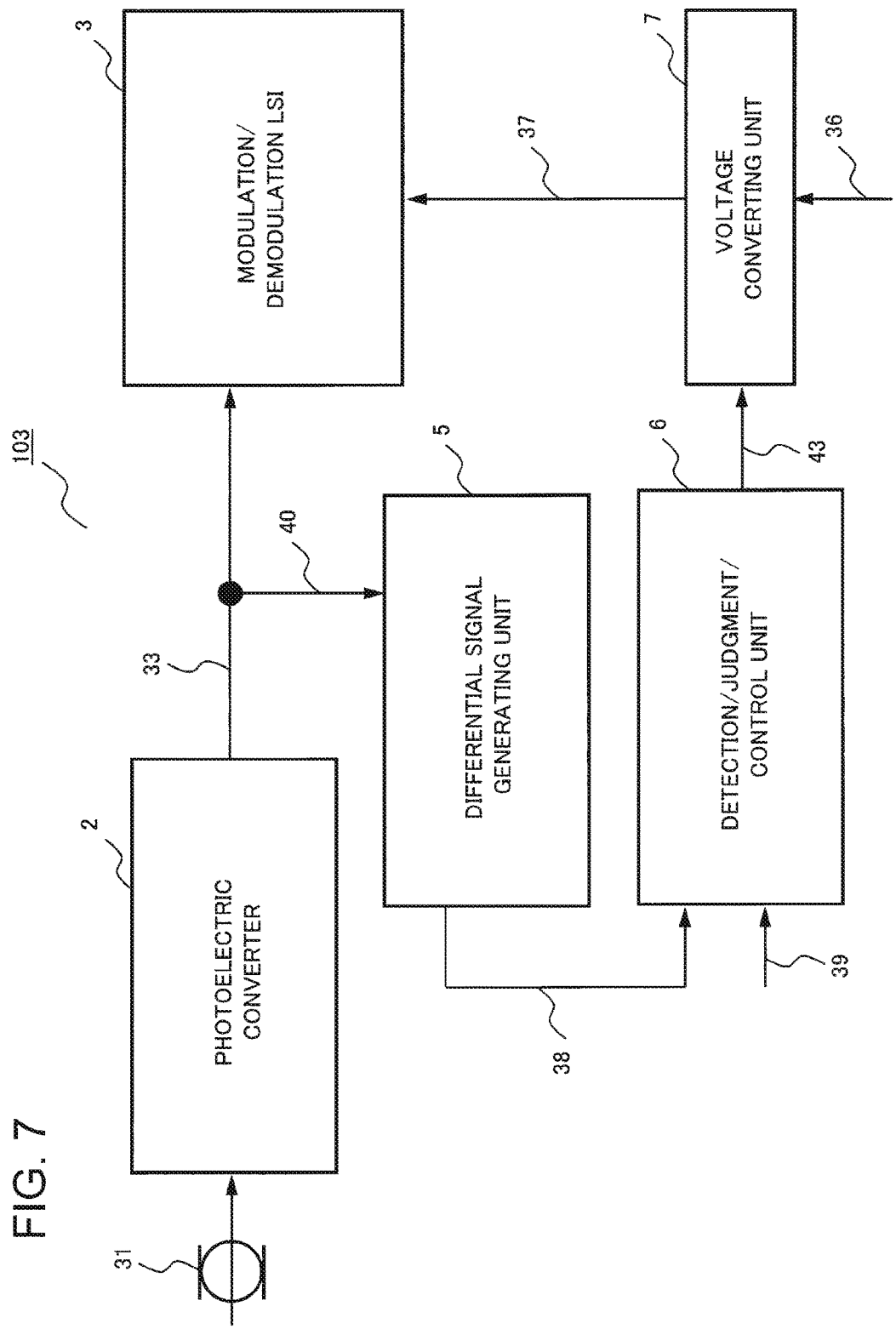
FIG. 7 is a block diagram illustrating a whole configuration of a voltage control device in accordance with the fifth exemplary embodiment of the present invention.

Next, the fifth exemplary embodiment will be described in detail with reference to drawings. FIG. 7 is a block diagram illustrating a whole configuration of a voltage control device 103 in accordance with the fifth exemplary embodiment of the present invention. In the voltage control device 102 of the fourth exemplary embodiment, the optical signal 31 is divided in light, and the photoelectric conversion is performed on the divided light, and then the electric signal generated by the conversion is inputted into the differential signal generating unit 5. On the other hand, in the voltage control device 103 in accordance with the fifth exemplary embodiment, a part of the electric signals 33 converted by the photoelectric converter 2 is divided, and a divided signal 40 is inputted into the differential signal generating unit 5. That is to say, the photoelectric converter 2 has a function as the light detecting unit 9 of the fourth exemplary embodiment in addition to functions in above-mentioned exemplary embodiments. Although the above-mentioned configuration differs, the configurations except it are the same as those of the fourth exemplary embodiment. Components which are the same as those in the fourth exemplary embodiments are represented by the same signs.

The signal 40 is similar to the signal 35 in the fourth exemplary embodiment, and the signal 40 changes between a conduction state and a non-conduction state depending on the input state and the cut-off state of the optical signal 31. Therefore, the operations of the optical signal and the various electric signals are the same as those in the fourth exemplary embodiment.

The above-mentioned configuration enables to suppress the variation of the supply voltage to the modulation/demodulation LSI 3. The signal 40 inputted into the differential signal generating unit 5 is generated without dividing the optical signal 31. This enables to generate the differential signal 38 with less noise and higher quality in comparison with generating the differential signal from a part of feeble optical signal 31, and consequently it is possible to control the output voltage of the voltage converting unit 7 more stably.

[The Sixth Exemplary Embodiment]

Figure 8:
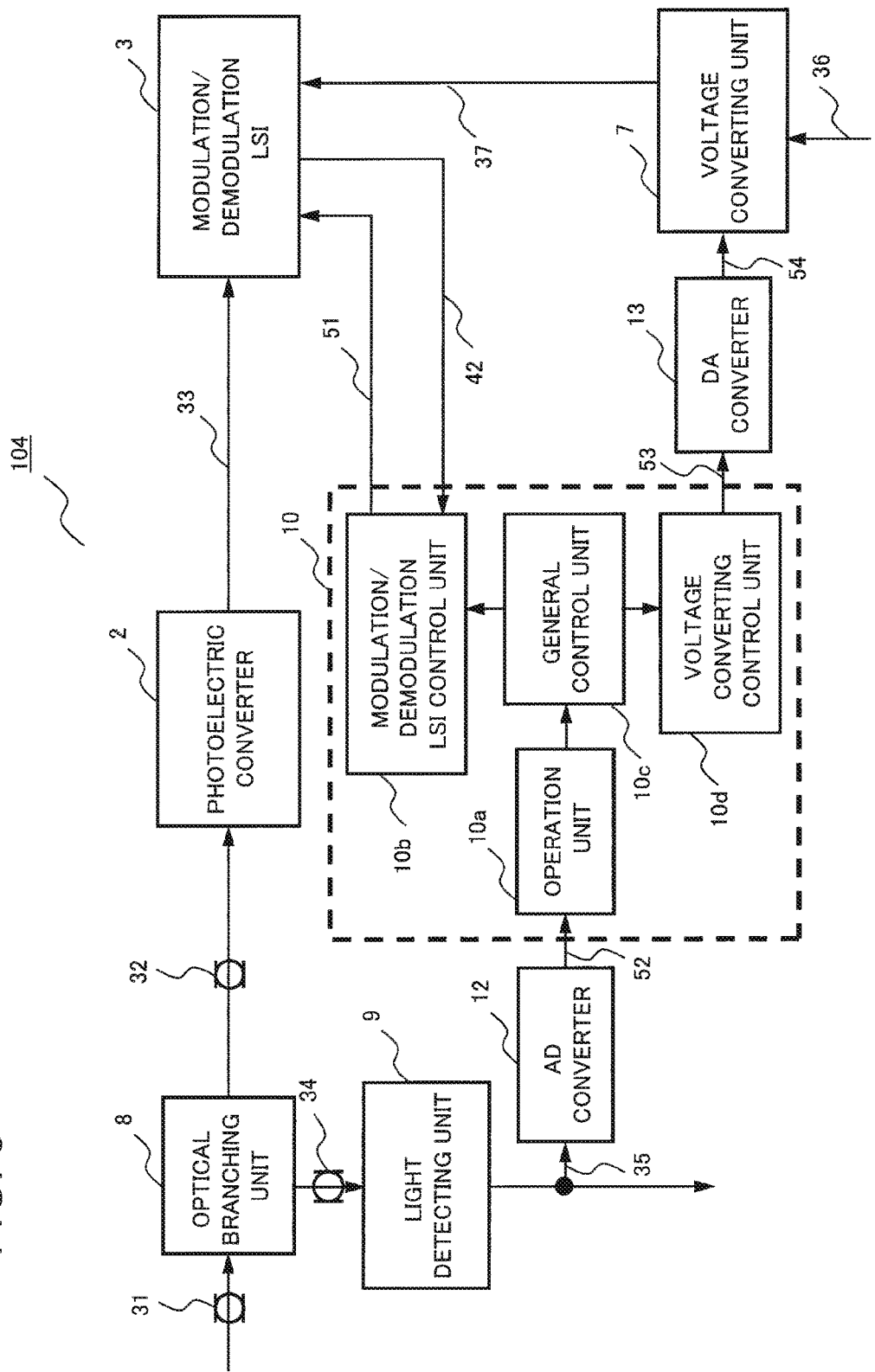
FIG. 8 is a block diagram illustrating a whole configuration of a voltage control device in accordance with the sixth exemplary embodiment of the present invention.

Next, the sixth exemplary embodiment will be described in detail with reference to drawings. FIG. 8 is a block diagram illustrating a whole configuration of a voltage control device 104 in accordance with the sixth exemplary embodiment of the present invention. In the voltage control device 104 of the sixth exemplary embodiment, the target voltage of the voltage converter unit 7 is set by means of digital processing processes. Specifically, a digital controller 10 includes the differential signal generating unit 5 and the detection/judgment/control unit 6 in the fourth exemplary embodiment. An AD converter 12 is disposed between the light detecting unit 9 and an operation unit 10a in the digital controller 10, and a DA converter is disposed between a voltage converting control unit 10d in the digital controller 10 and the voltage converting unit 7. Components which are the same as those of the above-mentioned exemplary embodiments are represented by the same signs.

The digital controller 10 is an integrated circuit such as a microcomputer, FPGA (field programmable gate array), PLD (programmable logic device), and DSP (digital signal processor), and includes the operation unit 10a, a modulation/demodulation LSI control unit 10b, a general control unit 10c, and the voltage converting control unit 10d.

The AD converter 12 inputs the optical signal 35 of at least part of electric signals output from the light detecting unit 9, and converts the signal 35 into a digital monitoring signal 52, which is output. The signal 35 is an analog signal corresponding to the input state and the cut-off state of the optical signal 34.

The operation unit 10a inputs the digital monitoring signal 52 changing according to the optical signal 31, and transfers a variation of the optical signal to the general control unit 10c by outputting a signal obtained by a differential process.

The general control unit 10c inputs the signal output from the operation unit 10a, and on the basis of the signal, transfers the information on the rapid change of the consumption electric power of the modulation/demodulation LSI 3 to the modulation/demodulation LSI control unit 10b. In addition, the general control unit 10c determines the target voltage of the voltage converting unit 7 and transfers the information on the target voltage to the voltage converting control unit 10d.

The modulation/demodulation LSI control unit 10b outputs a signal 51 for changing the setting of the modulation/demodulation LSI 3 to the modulation/demodulation LSI 3 on the basis of the information received from the general control unit 10c and the monitoring signal 42 described in the third exemplary embodiment. The time when the modulation/demodulation LSI control unit 10b starts obtaining the information from the general control unit 10c is earlier than a start time when the monitoring information is obtained from the monitoring signal 42, and the time when the modulation/demodulation LSI control unit 10b finishes obtaining the information from the general control unit 10c is earlier than an end time when the monitoring information is obtained from the monitoring signal 42. A timing of the setting change information of the signal 51 is generated by using two kinds of timing regarding information acquisition. By inputting the signal 51, the modulation/demodulation LSI 3 forcibly controls a rapid change of the consumption current arising with the optical signal 32 changing between the input state (conduction state of electric signal 33) and the cut-off state (non-conduction state of electric signal 33).

The voltage converting control unit 10d outputs a signal 53 which controls the output voltage of the voltage converting unit 7 on the basis of the information on the target voltage received from the general control unit 10c.

The DA converter 13 converts the inputted signal 53 into a signal 54 controlling the target voltage output from the voltage converter unit 7, and outputs the signal 54.

Next, the operation in the sixth exemplary embodiment of the present invention will be described. Each of the optical signals 32 and 34 has the same waveform as that of the optical signal 31, and the electric signal 33 and the signal 35 which are converted by the photoelectric converter 2 and the light detecting unit 9 respectively are electric waveforms corresponding to the optical signal 31. Specifically, the input state of the optical signal 31 corresponds to the conduction states of the electric signal 33 and the signal 35, and the cut-off state of the optical signal 31 corresponds to the non-conduction states of the electric signal 33 and the signal 35.

When the optical signal 31 changes from the input state (conduction state of electric signal) into the cut-off state (non-conduction state of electric signal), the controller 10 detects the cut-off state by the digital monitoring signal 52. On the basis of this, the setting of the modulation/demodulation LSI 3 is changed by the signal 51 from the modulation/demodulation LSI control unit 10b, and the control is forcibly performed so that the consumption electric power may not change rapidly. In addition, the target voltage of the voltage converting unit 7 is lowered through the DA converter 13 by the signal 53 from the voltage converting control unit 10d. After the output voltage of the voltage converting unit 7 has become stable, the demodulating operation of the modulation/demodulation LSI 3 is brought to a complete stop by the signal 51 from the modulation/demodulation LSI control unit 10b. When the optical signal 31 changes from the cut-off state into the input state, the controller 10 detects the input state by the digital monitoring signal 52. On the basis of this, the setting of the modulation/demodulation LSI 3 is changed by the signal 51 from the modulation/demodulation LSI control unit 10b, and the control is forcibly performed so that the demodulating operation may not be started immediately. In addition, the target voltage of the voltage converting unit 7 is increased through the DA converter 13 by the signal 53 from the voltage converting control unit 10d. After the output voltage of the voltage converting unit 7 has become stable, the forced outage of the demodulation operation in the modulation/demodulation LSI 3 is released by the signal 51 from the modulation/demodulation LSI control unit 10b. In the above-mentioned operations, the sequential process for starting the demodulating operation is controlled at a low speed. This enables the change of the target voltage value of the voltage converting unit 7 to follow adequately the increase in the consumption current in the modulation/demodulation LSI 3 which is caused by the initiation of the demodulating operation. As a result, it is possible to suppress to the minimum a voltage drop of the voltage converting unit 7 associated with the initiation of the demodulating operation with a high degree of accuracy.

Although, in the sixth exemplary embodiment, the AD converter 12 is disposed in a stage preceding the operation unit 10a in the controller 10, and the DA converter 13 is disposed in a stage following the voltage converting control unit 10d in the controller 10, so as to be electrically connected to each other, these components can be included in the controller 10. It is also acceptable to remove the AD converter 12 and the DA converter 13. In which case, the controller 10 does not process digital signals but processes analog signals. In this case, an operation unit, a general control unit, a voltage converting control unit, and a modulation/demodulation LSI control unit, which can process analog signals, are used.

The present invention is not limited to the aforementioned exemplary embodiments. The exemplary embodiments can be combined. Various modifications can be made therein within the scope of the present invention as defined by the claims, and obviously, such modifications are included in the scope of the present invention.

This application is based upon and claims the benefit of priority from Japanese Patent Application No. 2012-211107 filed on Sep. 25, 2012, the disclosure of which is incorporated herein in its entirety by reference.

REFERENCE SIGNS LIST 2, 202 photoelectric converter
3, 203 modulation/demodulation LSI
4 control unit
5 differential signal generating unit
6 detection/judgment/control unit
7, 207 voltage converting unit
8 optical branching unit
9 light detecting unit
10 controller
10a operation unit
10b modulation/demodulation LSI control unit
10c general control unit
10d voltage converting control unit
12 AD converter
13 DA converter
31, 32, 34, 211 optical signal
33 electric signal
35, 40, 41, 43, 51, 53, 54 signal
36 voltage
37 supply voltage
38 differential signal
39 reference signal
42 monitoring signal
52 digital monitoring signal
99 to 104, 200 voltage control device
201 power supply

The invention claimed is:

1. A voltage control device, comprising:
 a voltage convertor configured to convert a voltage of a power supply on the basis of a target voltage and to supply a converted voltage to a device,
 a controller configured to control the target voltage depending on an operation state of the device, and;
 a detector configured to detect the operation state of the device;
 wherein the controller is configured to determine the operation state on the basis of a signal from the detection unit, and
 wherein the device is a demodulator converting an optical signal into an electric signal; and
 the controller configured to obtain information on a change between a conduction state and a non-conduction state of the optical signal, from the detection unit.

2. The voltage control device according to claim 1, further comprising
 an optical branching unit dividing at least part of an optical signal;

a light detecting unit converting photoelectrically an optical signal divided by the optical branching unit into an electric signal as the detector;

a generating unit generating a differential signal from an output of the light detecting unit; and a detection unit detecting the differential signal exceeding a permitted region;

wherein the controller detects a changing state between a conduction state and a non-conduction state of the signal from the light detecting unit.

3. The voltage control device according to claim 2, wherein an output signal of the detector changes in a sawtooth wavelike form corresponding to the changing state between the conduction state and the non-conduction state of the signal from the detector; and the controller controls the target voltage of the voltage converting unit to be a voltage variation of the sawtooth wavelike form.

4. The voltage control device according to claim 3, wherein the controller, on the basis of an information signal and an output signal of the detector, brings a demodulating operation of the modulation/demodulation unit to a complete stop after a voltage variation of an output of the voltage converting unit has become stable if the controller detects a non-conduction state of the signal from the detector, and starts the demodulating operation of the modulation/demodulation unit after the voltage variation of the output of the voltage converting unit has become stable if the controller detects a conduction state of the signal from the detector.

5. The voltage control device according to claim 3, wherein the signal from the detector has a prescribed voltage difference, an upper level of the voltage difference corresponds to a conduction state, and a lower level of the voltage difference corresponds to a non-conduction state.

6. The voltage control device according to claim 2, wherein the controller, on the basis of an information signal and an output signal of the detector, brings a demodulating operation of the modulation/demodulation unit to a complete stop after a voltage variation of an output of the voltage converting unit has become stable if the control unit detects a non-conduction state of the signal from the detector, and starts the demodulating operation of the modulation/demodulation unit after the voltage variation of the output of the voltage converting unit has become stable if the control unit detects a conduction state of the signal from the detector.

7. The voltage control device according to claim 2, wherein the signal from the detector has a prescribed voltage difference, an upper level of the voltage difference corresponds to a conduction state, and a lower level of the voltage difference corresponds to a non-conduction state.

8. The voltage control device according to claim 1, wherein the controller, on the basis of an information signal and an output signal of the detector, brings a demodulating operation of a modulation/demodulation unit serving as the device to be supplied with voltage to a complete stop after a voltage variation of an output of the voltage converting unit has become stable if the controller detects a non-conduction state of the signal from the detection unit, and starts the demodulating operation of the modulation/demodulation unit after the voltage variation of the output of the voltage converting unit has become stable if the controller detects a conduction state of the signal from the detector.

9. The voltage control device according to claim 1, wherein the signal from the detector has a prescribed voltage difference, an upper level of the voltage difference corresponds to a conduction state, and a lower level of the voltage difference corresponds to a non-conduction state.

10. The voltage control device according to claim 1, wherein the controller obtains an information signal including the operation state from the device to be supplied with voltage, and determines the operation state on the basis of the information signal.

11. The voltage control device according to claim 10, wherein the device to be supplied with voltage is a modulation/demodulation unit converting an electric signal generated from an optical signal by photoelectric conversion into a demodulated signal; and the controller controls the target voltage to be a specific voltage level on the basis of the operation state of the modulation/demodulation unit which is obtained from the information signal.

12. The voltage control device according to claim 11, wherein, if the modulation/demodulation unit is in one of a conduction state and a non-conduction state, the controller sets the target voltage of the voltage converting unit at two different voltage levels, and makes the target voltage of the conduction state higher than the target voltage of the non-conduction state.

13. The voltage control device according to claim 1, further comprising:

an optical branching unit dividing at least part of an optical signal;

a light detecting unit converting photoelectrically an optical signal divided by the optical branching unit into an electric signal as the detection unit;

a generating unit generating a differential signal from an output of the light detecting unit; and a detection unit detecting the differential signal exceeding a permitted region;

wherein the controller detects a changing state between a conduction state and a non-conduction state of the signal from the light detecting unit from the light detecting unit.

14. The voltage control device according to claim 1, wherein the controller, on the basis of an information signal and an output signal of the detector, brings a demodulating operation of the modulation/demodulation unit to a complete stop after a voltage variation of an output of the voltage converting unit has become stable if the control unit detects a non-conduction state of the signal from the detector, and starts the demodulating operation of the modulation/demodulation unit after the voltage variation of the output of the voltage converting unit has become stable if the control unit detects a conduction state of the signal from the detector.

15. The voltage control device according to claim 1, wherein the signal from the detector has a prescribed voltage difference, an upper level of the voltage difference corresponds to a conduction state, and a lower level of the voltage difference corresponds to a non-conduction state.

16. A method for controlling a voltage control device, comprising:

converting a voltage of a power supply on the basis of a target voltage, supplying a converted voltage to a device, and controlling the target voltage depending on an operation state of the device;

wherein the operation state includes a conduction state and a non-conduction state;

the target voltages of the conduction state and the non-conduction state are set at two different voltage levels; and the voltage control device is controlled so that the target voltage of the non-conduction state may become lower than the target voltage of the conduction state.

17. The method for controlling the voltage control device according to claim 16, the target voltage is increased at a change from the conduction state into the non-conduction state; and the target voltage is lowered at a change from the non-conduction state to the conduction state.

\* \* \* \* \*

UNITED STATES PATENT AND TRADEMARK OFFICE
CERTIFICATE OF CORRECTION

PATENT NO. : 10,185,294 B2
APPLICATION NO. : 14/430734
DATED : January 22, 2019
INVENTOR(S) : Takashi Yamane It is certified that error appears in the above-identified patent and that said Letters Patent is hereby corrected as shown below:

Claim 13, Column 16, Lines 45-46, delete the second instance of "from the light detecting unit".

Signed and Sealed this
Seventh Day of May, 2019

Andrei Iancu
*Director of the United States Patent and Trademark Office*